J. IRSCH.
AMUSEMENT DEVICE.
APPLICATION FILED AUG. 13, 1919.
1,343,083.
Patented June 8, 1920.
2 SHEETS—SHEET 2.
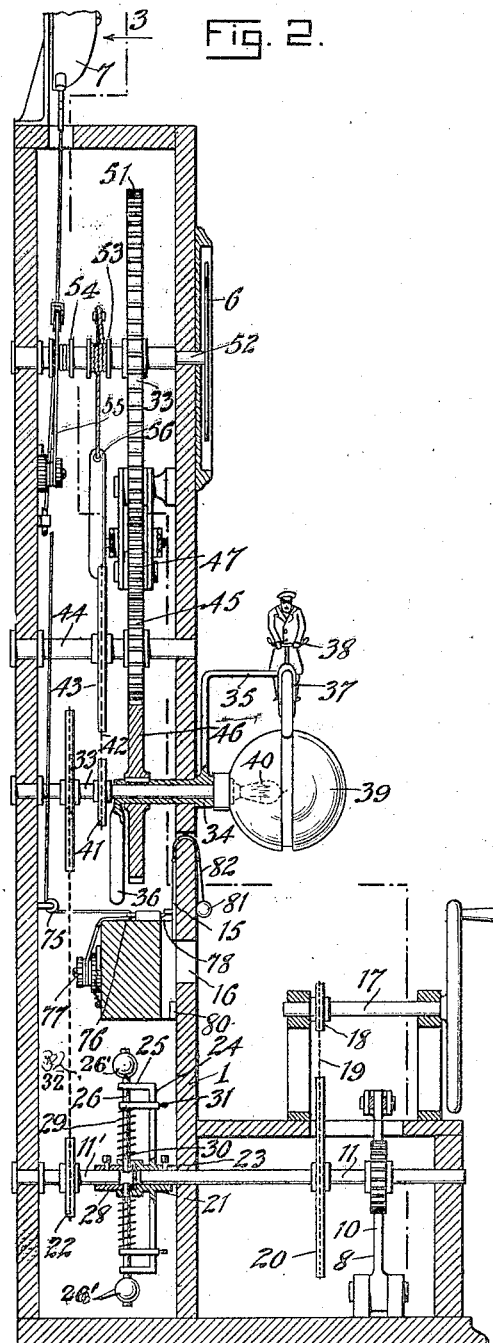
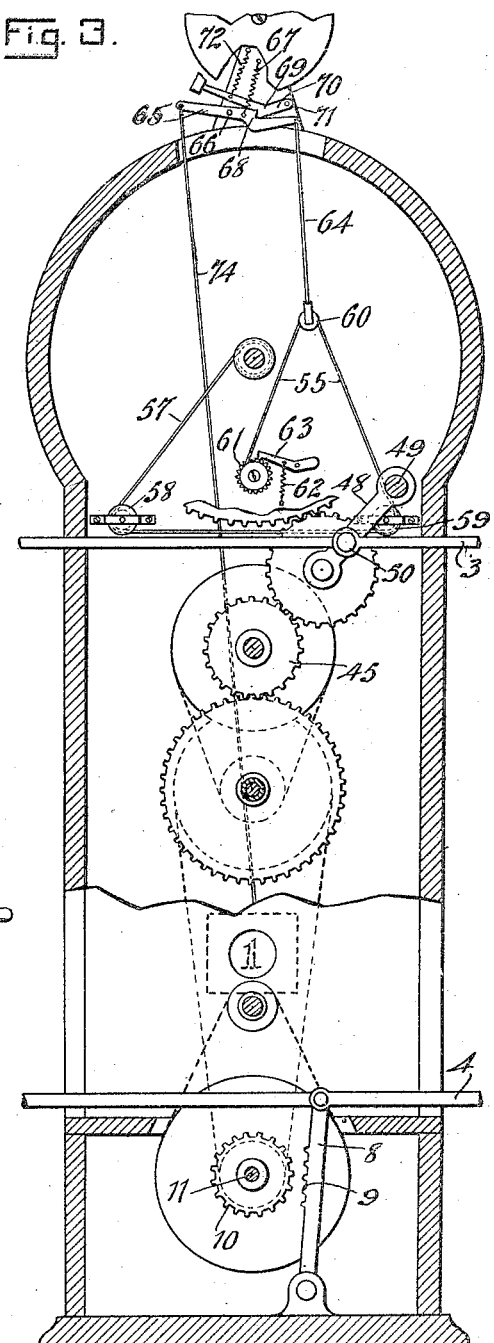

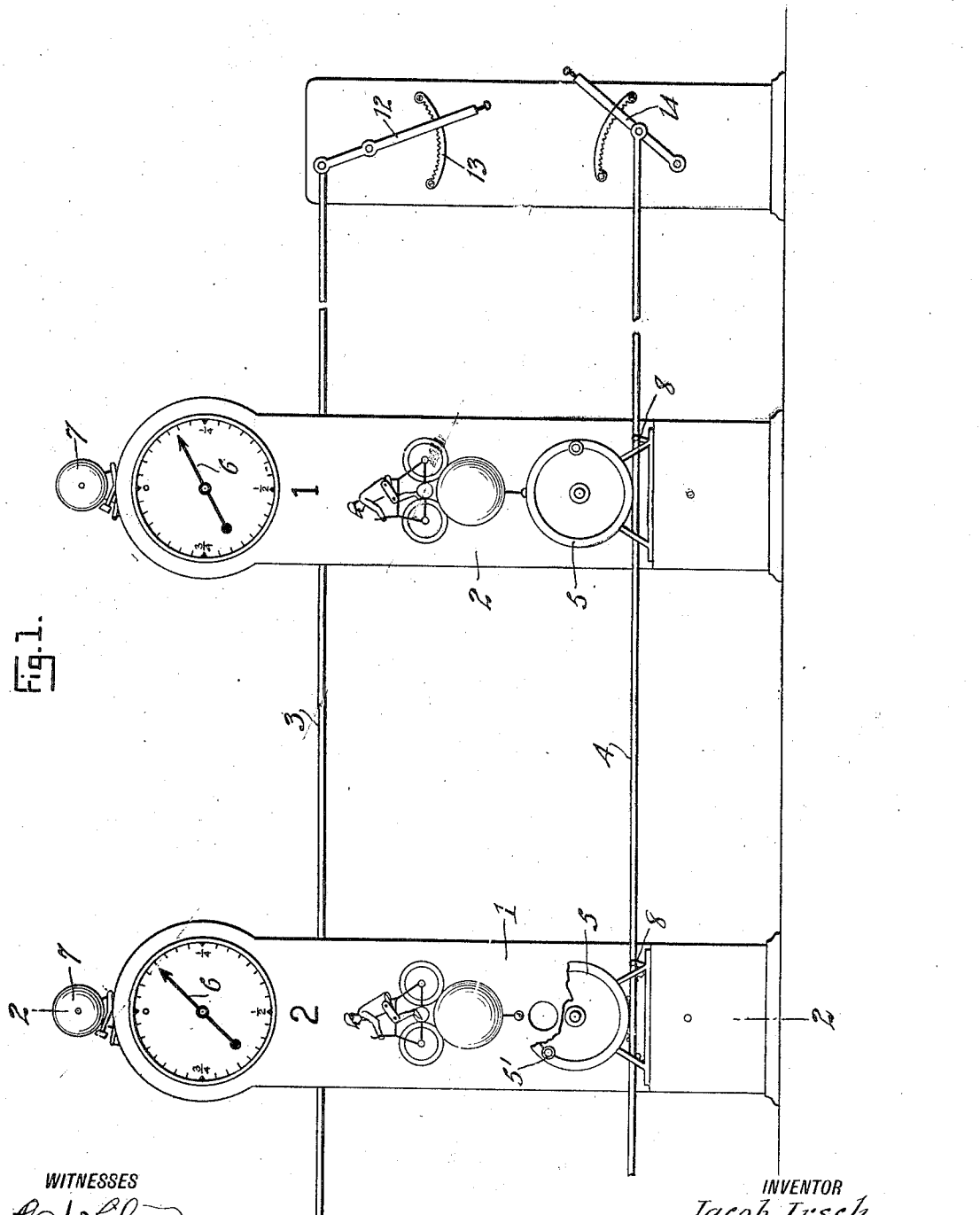

UNITED STATES PATENT OFFICE.

JACOB IRSCH, OF NEW YORK, N. Y.

AMUSEMENT DEVICE.

1,343,083.

Specification of Letters Patent.

Patented June 8, 1920.

Application filed August 13, 1919. Serial No. 317,224.

*To all whom it may concern:*

Be it known that I, JACOB IRSCH, a citizen of the United States, and a resident of the city of New York, Long Island City, borough of Queens, in the county of Queens and State of New York, have invented a new and useful Amusement Device, of which the following is a full, clear, and exact description.

This invention relates to amusement devices, and has for an object to provide a simple, easily operated and controlled construction which indicates at all times by the position of a moving figure, the results being secured by an operator.

Another object is to provide an amusement device in the nature of a globe bicycle race with both the globe and the bicycle rider moving at a speed in proportion to the speed of movement of the operator.

A further object is to provide a series of independent bicycles and riders on independent globes with an independent manually operated driving device for causing the bicycle to move.

A still further object is to provide a number of racing figures on bicycles with manually actuated devices for driving them, and an automatic disconnecting device for cutting off the driving devices when operated at too high a speed.

In the accompanying drawings:

Figure 1 is a front view of an amusement device disclosing an embodiment of the invention.

Fig. 2 is a sectional view through Fig. 1 on line 2—2, the same being on an enlarged scale.

Fig. 3 is a section through Fig. 2 on line 3—3.

Referring to the accompanying drawings 1 and 2 indicate casings carrying a plurality of moving parts forming independent sections connected by the master controlled rods 3 and 4. Rod 3 acts to connect and disconnect the manually operated wheels 5 with the pointers 6 and the bells 7 while the rod 4 connects the various positive clutches or locking levers 8 which are provided with teeth 9 (Fig. 3) designed to mesh with the gear wheel 10 rigidly secured to the shaft 11. The rod 3 is connected to a pivotally mounted lever 12 having a suitable catch designed to engage the teeth of the arc-shaped rack 13 for locking the lever in any adjusted position. A similar lever 14 is connected to the rod 4 whereby the person in charge of the device may at any time move either rod. The intention when playing the device is to cause the pointer to make one revolution first and to sound the bell 7 first. After one competitor has rung the bell the person in charge immediately pulls the lever 12 whereupon all of the pointers 6 and bells 7 are disconnected from their respective driving wheels 5. As soon as the bell rings the signal plate 15 drops down opposite the opening 16 thus indicating who has won the race. The pulling of the lever 12 does not restore this plate, but prevents any other plates from dropping down. Shortly after lever 12 has been pulled, lever 14 is pulled for locking all of the driving wheels from further movement thus preventing any tampering with the device.

The detail workings of the various parts may be clearly seen in Figs. 2 and 3. The driving wheel 5 is rigidly secured to a power shaft 17 mounted on suitable brackets on the casing 1, said shaft carrying a sprocket wheel 18 designed to drive a sprocket chain 19 which actuates the sprocket wheel 20 rigidly secured to the driving shaft 11. This shaft has a governor 21 secured thereto, said governor driving normally a sprocket wheel 22. This governor is designed to release the sprocket wheel 22 when the shaft 11 is being rotated too fast. As shown in Fig. 2 the governor 21 is provided with a hub 23 having radiating arms 24 formed with turned over apertured ends 25. A radially movable rod 26 slidingly fits in each of the ends 25 and extends through the sleeve 27 of the hub 23 and into the auxiliary hub 28 connected to the auxiliary shaft 11' to which the sprocket wheel 22 is rigidly secured. By this arrangement the shafts 11 and 11' are normally connected and operate as one. However, whenever the speed of shaft 11 becomes too great the centrifugal section on rods 26 and the weight 26' carried thereby will cause the rods to move out of engagement with the auxiliary hub 28 whereupon the shaft 11', the sprocket 22 and all parts connected therewith are disconnected with the driving power. In order to cause the rods to move back into their former position a spring 29 surrounds each rod and bears against the stops 30 connected to the rods.

An adjustable fixed stop 31 acts against the outer ends of the springs for permitting an adjustment of the tension of the springs and thereby causing a greater or less speed to disconnect the governor.

The sprocket wheel 22 carries a chain 32 which also passes over a comparatively large sprocket wheel, rigidly secured to the shaft 33. This shaft extends into the sleeve 34 which carries the bracket 35 at one end and a counterbalance 36 at the other end. The bracket 35 is secured to the bicycle 37 which supports a figure 38. This figure has articulated legs with the feet thereof secured to the pedals of the bicycle whereby the friction of the tires on the globe 39 will rotate the wheels and also cause the legs to move as if the figure was propelling the bicycle. It will, of course, be understood that the bicycle is provided with suitable sprockets and a chain for driving the pedals. As the bracket rotates it will give the appearance of the figure propelling the bicycle around the globe 39. This globe is preferably formed of glass and suitably decorated so that when the lamp 40 is lighted an attractive effect will be produced. The lamp 40 is an ordinary electric bulb and is supplied with current from any suitable source in any suitable way. The globe 39 is rigidly secured to the shaft 33 and rotates in one direction while the bicycle moves in the opposite direction. Shaft 33 carries a comparatively small sprocket wheel 41 which accommodates the chain 42 passing over the comparatively large sprocket wheel 43 rigidly secured to the shaft 44. A pinion 45 is rigidly secured to the shaft 44 which continually meshes with the gear wheel 46 rigidly secured on the sleeve 34 whereby power is transmitted to the bicycle carrying bracket 35. The pinion is adapted to mesh with a throw-out or disconnecting gear 47 when the parts are in their operative position, as shown in Figs. 2 and 3. This gear is journaled on a lever 48 which in turn is pivotally mounted on the casing at 49. A suitable pivotal pin 50 connects the lever with the release rod 3 whereby when it is pulled from the position shown in Fig. 3 the power will be disconnected from the pointer 6 and bell 7. However, the parts normally are as shown in Fig. 3 until the gear 47 meshes with pinion 45 and with the large gear wheel 51 rigidly secured to the pointer shaft 52. This shaft carries two drums 53 and 54, drum 53 accommodating the cable 55 secured to the return weight 56 which acts to rotate the shaft 52 and pointer 6 back to their neutral or former position as soon as the gear 47 has been disengaged from the pinion 45. This action of weight 56 automatically resets the bell hammer as well as the pointer 6. The second drum 54 accommodates the bell cable 57 which passes from the drum over idlers 58 (Fig. 3) and 59 and from thence over idler 60 to an adjusting spool 61. This spool acts as a take up drum and is rotatably mounted on the casing 1, the spool being formed with a tooth section 62 for receiving the spring actuated locking pawl 63 whereby the spool may be manually rotated in either direction, but will remain in any position in which it is left. This arrangement permits an exact adjustment in an easy manner of the pull cord 64 connected to the hammer operating lever 65. This lever is pivotally mounted at 66 and is normally held in a given position by a spring 67. Lever 65 is provided with a projection 68 extending into an offset 69 of the hammer arm 70. The arm 70 is pivotally mounted at 71 and held normally in a given position by spring 72 so that when pulled by lever 65 and then released it will cause the hammer 73 to strike the bell 7. When the parts 68 and 69 are interlocked as shown in Fig. 3 and the cord 64 is pulled the pivotal movement of lever 65 will also cause a pivotal movement of arm 70 against the action of spring 72 until projection 68 slips out of or off the offset 69 whereupon the bell 7 will be sounded. As soon as the cord 64 is released the lever 65 and arm 70 will resume their former position by reason of the action of spring 67. When the lever 65 is being moved by cord 64 a cable 74 is being pulled. This cable passes through a suitable guide 75 below shaft 33, then through a second guide 76 and from thence to a take-up device 77 similar to spool 61. The eyelet or guide 76 is secured to an ordinary spring pressed catch 78 which normally extends below and into the path of movement of the extension 79 of the plate 15 for normally supporting the plate. The cable 74 and parts associated therewith are adjusted so that when the bell is sounded the catch 78 will release the plate 15 and permit the same to drop under the action of gravity until it strikes a suitable stop 80. This will cause the number on the plate to show through the opening 16 for indicating the winner. The plate 15 can only be restored or reset by a pull on the ball 81 secured to the cord 82 extending through the aperture 83 which cord is connected in any suitable manner to the plate. Different rules for playing the device may be provided. After each play the pointers are automatically reset to zero and the bicycles are automatically brought back to a position on top of their respective globes. The various wheels 5 are also locked manually. When one or more persons wish to play the knobs 5' on the respective wheels 5 are grasped and when everyone is ready the person in charge pulls the lever 14 for releasing the locks 8 and at the same time says "Go" or gives some other appropriate signal. As soon as one of the contestants has caused his bell to ring and his plate 15 to drop the lever 12 is pulled so as to prevent any one else finishing the race.

What I claim is:

1. An amusement device comprising a plurality of stations or sections, a movable pointer arranged at each station, a sounding device arranged at each station, a manually operated member for actuating said pointer and said sounding device in such a manner that the sounding device will be sounded when the pointer has made one revolution, and means for disconnecting the pointer and manually operated member when the manually operated member is being moved faster than a predetermined speed, means for resetting said pointer, and means operable at a distance for locking said manually operated member.

2. An amusement device comprising a casing, a dial arranged on said casing, a pointer positioned to move over said dial, a shaft for turning said pointer, a globe, a second shaft carrying said globe, a vehicle arranged on said globe, a figure arranged on said vehicle and connected with the wheels thereof in such a manner as to be moved as the wheels are moved by the globe during the rotation thereof, a transmission mechanism connected to both of said shafts and to said vehicle for rotating the same in timed relation, the rotation of the globe being in one direction and the vehicle in the opposite direction, and a manually operated power member connected with said transmission for actuating the same.

3. An amusement device comprising a casing, a shaft extending from said casing, a globe secured to said shaft, a sleeve surrounding said shaft provided with a bracket, a vehicle mounted on said globe and frictionally engaging the same, said globe being connected with said bracket, a figure arranged on said vehicle and operated by the wheels thereof, a transmission mechanism connected with said shaft and with said sleeve, a manually operated power member for actuating said transmission mechanism, said transmission mechanism being constructed to rotate the globe in one direction and the bracket together with the vehicle in the opposite direction so as to give the appearance of the vehicle rider forcing the vehicle around the globe.

4. An amusement device comprising a casing, a shaft extending from the casing, a globe secured to said shaft, a sleeve mounted on said shaft provided with a bracket and a weight for turning the bracket to an upward position above the globe whenever released, a bicycle connected with said bracket and positioned so that the wheels will frictionally engage the globe so as to be actuated thereby, a figure connected with the bicycle and connected with the wheels so that the legs of the figure will operate as the wheels rotate, a transmission mechanism connected with the shaft and with the bicycle for actuating the same so that the globe will rotate in one direction and the bicycle in the opposite direction, and a manually operated wheel for actuating said transmission mechanism.

5. An amusement device comprising a casing, a dial arranged on the casing, a pointer positioned to move over said dial, a shaft connected with said pointer for rotating the same, a sounding device, a signal plate having a number thereon, a catch for normally holding the signal plate out of view, means connected with said shaft for operating said sounding device, means connecting the sounding device with said catch for releasing the catch when the sounding device has been operated whereby said signal device will automatically move to view, the parts connected with the sounding device and the catch being arranged to be actuated by said shaft when said pointer has made one revolution, a transmission mechanism for actuating said shaft, and a manually operated member for actuating said transmission mechanism.

6. An amusement device comprising a casing, a dial mounted on the casing, a pointer adapted to move over said dial, a sounding device, a rotatable globe, a bicycle rider mounted on the globe, a manually operated power member, and a transmission, for actuating said signal device, said pointer, said globe and said bicycle rider, said transmission including a centrifugally actuated governor for disconnecting the power member automatically whenever the same is being operated faster than a predetermined speed.

7. An amusement device comprising a casing a rotatable pointer, a drum connected with said pointer, a weighted cable connected with said drum adapted to move said pointer backward for resetting the same after each operation, a driving mechanism for rotating the pointer from zero position, means for automatically disconnecting said driving mechanism from said pointer when moved faster than a predetermined speed, means for manually disconnecting said driving mechanism from said pointer, and means for locking said driving mechanism against operation.

8. An amusement device comprising a casing, a dial arranged on said casing, a pointer arranged to travel over said dial, a shaft carrying said pointer, a weighted cable connected to said shaft for returning the shaft and pointer to zero, a bell, a hammer, a lever for operating said hammer, a cable connected to said shaft and pulled thereby when said pointer is being moved from zero, said cable being connected to said lever for operating the same, the parts being so adjusted that the hammer will strike the bell simultaneously with the completion of one revolution of said pointer, a reduction transmission mechanism connected to said shaft, a hand operated wheel for actuating said reduction transmission, a movable member arranged in said transmission mechanism for releasing said shaft, and a lock for locking said transmission mechanism against movement.

9. An amusement device comprising a casing, a dial mounted on said casing, a pointer positioned to travel over said dial, a shaft supporting said pointer, a globe arranged beneath said dial, a vehicle having wheels positioned on said globe, a figure on said vehicle connected to the vehicle in such a manner that part thereof will operate with the wheels of the vehicle, said wheels being in contact with said globe and rotatable thereby, a shaft for rotating said globe, a sleeve for causing said vehicle to move around the globe in a direction opposite to the direction of rotation of the globe, a hand operated wheel arranged near the bottom of said housing, means for connecting said hand operated wheel with the shaft carrying said pointer, the shaft carrying said globe and with said sleeve whereby when said hand-operated wheel is rotated the pointer, vehicle and globe will all be operated simultaneously in timed relation.

10. An amusement device comprising a casing having an opening, a dial mounted on the casing, a pointer arranged to travel over said dial from a starting point to zero, a shaft supporting said pointer, a bell, a hammer for sounding said bell, a lever for operating said hammer, means connecting said shaft with said lever for operating the lever when said pointer has reached zero, a number plate normally positioned above the opening in said casing, a catch for holding said plate in position, means connecting said catch and said lever whereby when the lever operates the hammer said catch will be disengaged from said plate and permit the plate to move opposite said opening for disclosing the number thereon, a hand operated wheel, and means connecting said hand operated wheel with said shaft for operating the same and devices connected therewith.

11. An amusement device comprising a casing, a globe, a bicycle and rider mounted on the globe, a manually operated member and transmission mechanism connected with said bicycle and said globe operated by said manually operated member for causing the globe to turn in one direction and causing the bicycle and rider to move in the opposite direction.

JACOB IRSCH